United States Patent
Ahsbahs et al.

(10) Patent No.: US 6,595,637 B2
(45) Date of Patent: Jul. 22, 2003

(54) PROGRESSIVE MULTIFOCAL OPHTHALMIC LENS WITH FAST POWER VARIATION

(75) Inventors: Francoise Ahsbahs, Saint Maur des Fosses (FR); Gilles Le Saux, Paris (FR)

(73) Assignee: Essilor International (FR)

(*) Notice: Subject to any disclaimer, the term of this patent is extended or adjusted under 35 U.S.C. 154(b) by 0 days.

(21) Appl. No.: 10/030,362
(22) PCT Filed: May 16, 2001
(86) PCT No.: PCT/FR01/01492

§ 371 (c)(1),
(2), (4) Date: May 9, 2002

(87) PCT Pub. No.: WO01/88601

PCT Pub. Date: Nov. 22, 2001

(65) Prior Publication Data

US 2002/0171803 A1 Nov. 21, 2002

(30) Foreign Application Priority Data

Mar. 16, 2000 (FR) .............................. 00 06214

(51) Int. Cl.⁷ ................................................ G02C 7/06
(52) U.S. Cl. ....................................................... 351/169
(58) Field of Search ................................ 351/168, 169, 351/170, 171, 172

(56) References Cited

U.S. PATENT DOCUMENTS

| 4,854,689 | A | | 8/1989 | Dufour et al. |
|---|---|---|---|---|
| 5,270,745 | A | | 12/1993 | Pedrono |
| 5,272,495 | A | * | 12/1993 | Pedrono ...................... 351/169 |
| 5,488,442 | A | | 1/1996 | Harsigny et al. |
| 5,708,493 | A | | 1/1998 | Ahsbahs et al. |
| 5,719,658 | A | * | 2/1998 | Ahsbahs et al. ............. 351/169 |
| 6,116,734 | A | * | 9/2000 | Pedrono et al. ............. 351/159 |
| 6,220,705 | B1 | * | 4/2001 | Francois et al. ............ 351/169 |

* cited by examiner

*Primary Examiner*—Scott J. Sugarman
(74) *Attorney, Agent, or Firm*—Fish & Richardson P.C.

(57) ABSTRACT

The invention relates to a multifocal ophthalmic lens, comprising an aspherical surface with a mean sphere and a cylinder at every point thereof, characterized by the equation:

Figure 1:
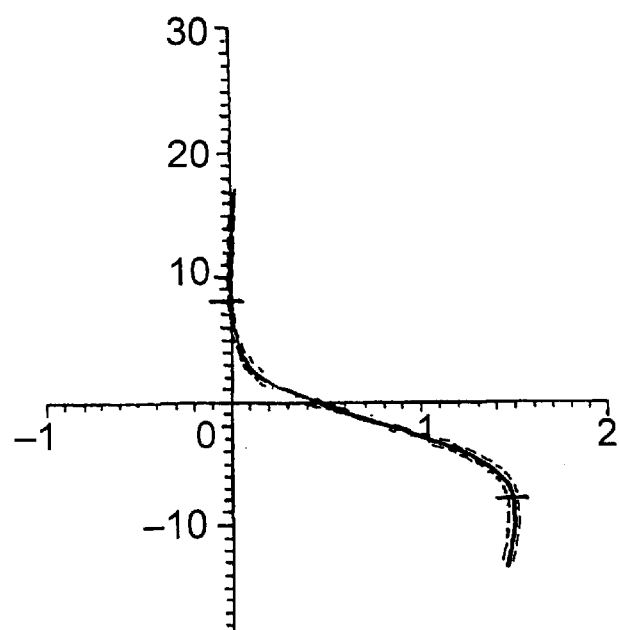

$$L < 1/(-0.031 \times R^2 + 0.139 \times R + 0.014)$$

where L is equal to the ratio $(S_{max}-S_{min})/\mathrm{grad}S_{max}$, the ratio of the difference between the maximum and minimum values of the mean sphere in a region of a 40 mm diameter circle centered on the geometric center of the lens, this region being limited by vertical straight lines at 1 mm from this center on the temporal side and at 4 mm from this center on the nasal side, on the one hand, to the maximum value of the gradient of the mean sphere in this same region, on the other hand, and where R is equal to the ratio $C_{max}/(S_{max}-S_{min})$, the ratio of the maximum cylinder value inside said circle to the difference between the maximum and minimum values of the mean sphere in said region.

The invention provides a progressive lens with a small progression length, and a near vision region which is high on the lens. It is suitable for frames of small size, and is less tiring in extended use.

24 Claims, 3 Drawing Sheets

PROGRESSIVE MULTIFOCAL OPHTHALMIC LENS WITH FAST POWER VARIATION

The present invention relates to multifocal ophthalmic lenses. Such lenses are well known; they provide an optical power which varies continuously as a function of the position on the lens; typically when a multifocal lens is mounted in a frame, the power in the bottom of the lens is greater than the power in the top of the lens.

In practice, multifocal lenses often comprise an aspherical face, and a face which is spherical or toric, machined to match the lens to the wearer's prescription. It is therefore usual to characterize a multifocal lens by the surface parameters of its aspherical surface, namely at every point a mean sphere S and a cylinder.

The mean sphere S is defined by the following formula:

$$S = \frac{n-1}{2}\left(\frac{1}{R_1} + \frac{1}{R_2}\right)$$

where $R_1$ and $R_2$ are the minimum and maximum radii of curvature, expressed in meters, and n is the refractive index of the lens material.

The cylinder is given, using the same conventions, by the formula:

$$C = (n-1)\left|\frac{1}{R_1} - \frac{1}{R_2}\right|$$

Such multifocal lenses are well known; among these multifocal lenses it is possible to distinguish lenses called progressive lenses, adapted for vision at all distances, lenses more specifically dedicated to near vision and to intermediate vision and lenses dedicated to far vision and to intermediate vision. Generally, the invention is applicable to any lens having a power variation.

Progressive ophthalmic lenses usually comprise a far vision region, a near vision region, an intermediate vision region and a main meridian of progression passing through these three regions. Document FR-A-2 699 294, to which reference may be made for further details, describes in its preamble the various elements of a progressive multifocal ophthalmic lens, together with work carried out by the applicant in order to improve the comfort for wearers of such lenses. In short, the upper part of the lens, which is used by the wearer for distance vision, is called the far vision region. The lower part of the lens is called the near vision region, and is used by the wearer for close work, for example for reading. The region lying between these two regions is called the intermediate vision region.

The difference in mean sphere between a reference point of the near vision region and a reference point of the far vision region is thus called addition. These two reference points are usually chosen on the main meridian of progression defined below.

For all multifocal lenses, the power in the various far, intermediate and near vision regions, independently of their position on the lens, is determined by the prescription. The latter may comprise just a power value for near vision or a power value for far vision and an addition, and possibly an astigmatism value with its axis and prism.

Lenses dedicated more specifically to near vision do not really have a far vision region as with conventional progressive lenses, but a near vision region and a lower power region above this near vision region; the near vision region provides the wearer with clear and comfortable vision in near vision, that is to say in a plane located at about 30 cm; the decrease in power beyond this distance, in the upper part of the lens, allows the wearer to see clearly beyond that. These lenses are prescribed depending on the power needed by the wearer for near vision, independently of the far vision power.

Such a lens is described in an article of the Opticien Lunetier of April 1988, and is marketed by the applicant under the Essilor Delta brand; this lens is simple to use and as easy to put up with as a progressive lens, and is attractive for the presbyopic population not equipped with progressive lenses. This lens is also described in patent application FR-A-2 588 973. It has a central part which is equivalent to the unifocal lens that would normally be used to correct the presbyopia, so as to provide satisfactory near vision; this central part corresponds substantially to a near vision region of a progressive multifocal lens. In addition, it has a slight power decrease in the upper part, which also provides the wearer with clear vision beyond the normal field of near vision.

For progressive lenses, a line which is representative of the intersection of the aspherical surface of a lens with the gaze of an average wearer when he or she looks straight ahead at objects in a meridian plane, at different distances, is called the main meridian of progression. On the multifocal surface, the main meridian of progression is often an umbilical line, in other words, one for which all points have zero cylinder. This line is used in the definition of a progressive surface, as an optimization parameter. It is representative of the strategy for using the lens by the average wearer. Numerous choices for the meridian have been proposed; the simplest and the oldest consists in making a vertical umbilical line on the lens, and in inclining each lens on mounting in a frame, in order to take into account convergence of the gaze on passing from near vision to far vision.

On the aspherical face of a multifocal lens, this definition of the reference meridian corresponds substantially to a line which is formed from the middles of the horizontal segments connecting the half-addition isocylinder lines. In this context, the set of points having a given cylinder value is called an isocylinder line for this cylinder value.

A point, called a mounting center, is commonly marked on ophthalmic lenses, whether they are progressive or not, which point is used by the optician for mounting lenses in a frame. From the anthropometric characteristics of the wearer—pupil separation and height with respect to the frame—the optician machines the lens by trimming the edges, using the mounting center as a reference point. In lenses marketed by the applicant, the mounting center is located 4 mm above the geometric center of the lens; the center is generally located in the middle of the micro-etchings. For a lens correctly positioned in a frame, it corresponds to a horizontal direction of viewing, for a wearer holding his/her head upright.

The applicant has also proposed, in order to better satisfy the visual requirements of presbyopic persons and to improve the comfort of progressive multifocal lenses, adapting the shape of the main meridian of progression according to the power addition, see patent applications FR-A-2 683 642 and FR-A-2 683 643. FR-A-2 753 805 proposes plotting the meridian by ray tracing and allows the meridian to be determined, while taking account of bringing the reading plane closer and of the prismatic effects.

One of the problems which arises is that of mounting multifocal lenses in small frames; it happens during mounting of such lenses in small frames, that the lower part of the near vision region is removed on machining the lens. The wearer then has correct vision in far vision and in intermediate vision, but a near vision region which is too small in size. He or she tends to use the lower part of the intermediate vision region for near vision. This new problem is particularly acute because of the fashionable trend for small frames.

Another problem encountered by wearers of progressive multifocal lenses is tiredness in the case of extended work in near vision or in intermediate vision. This is because the near vision region of a progressive lens is in the bottom of the lens, and extended use of the near vision region may cause tiredness with some wearers.

A final problem is adaptation by the wearers to the lenses. It is known that wearers commonly have need of a period of adaptation to progressive lenses, before using the various lens regions in a suitable manner for the corresponding activities. The adaptation problem is encountered in particular for former bifocal lens wearers; these lenses have an area for near vision, the upper part of which is generally located 5 mm under the geometric center of the lens. However, in conventional progressive lenses, the near vision region is generally located lower; even if it is difficult to exactly determine the limit between the intermediate vision region and the near vision region, a wearer would be subject to less tiredness by using progressive lenses with near vision at 5 mm below the mounting center.

The invention provides a solution to these problems. It provides a lens capable of being mounted in small frames, without the near vision region being reduced. It also improves the comfort of wearers on extended use of the near vision region or the intermediate vision region. It also makes it easier for former wearers of bifocal lenses to adapt to the progressive lenses. More generally, the invention is applicable to any lens having a fast power variation; it provides a particularly advantageous compromise between the power variation and the maximum cylinder value.

More specifically, the invention provides a multifocal ophthalmic lens, comprising an aspherical surface with a mean sphere and a cylinder at every point thereof, characterized by the equation:

$$L < 1/(-0.031 \times R^2 + 0.139 \times R + 0.014)$$

where L is equal to the ratio $(S_{max}-S_{min})/\text{grad}S_{max}$, the ratio of the difference between the maximum and minimum values of the mean sphere in a region of a 40 mm diameter circle centered on the geometric center of the lens, this region being limited by vertical straight lines at 1 mm from this center on the temporal side and at 4 mm from this center on the nasal side, on the one hand, to the maximum value of the gradient of the mean sphere in this same region, on the other hand, and where R is equal to the ratio $C_{max}/(S_{max}-S_{min})$, the ratio of the maximum cylinder value inside said circle to the difference between the maximum and minimum values of the mean sphere in said region.

In one embodiment, the lens has a near vision region.

It may also have a far vision region.

In one embodiment, the angle between two half-lines coming from the geometric center of the lens and passing respectively through the points of a 20 mm radius circle centered on the geometric center which have a cylinder equal to half the difference $(S_{max}-S_{min})$ between the maximum and minimum values of the mean sphere in said region and which are located in the upper half of the lens is between 130° and 155°.

It is further advantageous that the angle between two half-lines coming from the geometric center of the lens and passing respectively through the points of a 20 mm radius circle centered on the geometric center which have a cylinder equal to half the difference $(S_{max}-S_{min})$ between the maximum and minimum values of the mean sphere in said region and which are located in the lower half of the lens is between 40° and 55°.

In one embodiment, at a point located on a half-circle of 20 mm radius centered on the geometric center in the upper part of the lens, and which has a cylinder equal to half the difference $(S_{max}-S_{min})$ between the maximum and minimum values of the mean sphere in said region, the ratio of the cylinder gradient to said difference is between 0.03 and 0.11 $\text{mm}^{-1}$.

In another embodiment, at a point located on a half-circle of 20 mm radius centered on the geometric center in the lower part of the lens, and which has a cylinder equal to half the difference $(S_{max}-S_{min})$ between the maximum and minimum values of the mean sphere in said region, the ratio of the cylinder gradient to said difference is between 0.05 and 0.014 $\text{mm}^{-1}$.

It is also possible that the ratio of the maximum cylinder gradient on the two points located on a half-circle of 20 mm radius centered on the geometric center in the lower part of the lens, and which have a cylinder equal to half the difference $(S_{max}-S_{min})$ between the maximum and minimum values of the mean sphere in said region, on the one hand, to the minimum cylinder gradient on the two points located on a half-circle of 20 mm radius centered on the geometric center in the upper part of the lens, and which have a cylinder equal to half the difference $(S_{max}-S_{min})$ between the maximum and minimum values of the mean sphere in said region, on the other hand, is less than 2.

Preferably, for a point located on a 20 mm radius circle centered on the geometric center, and whose mean sphere is greater than the minimum mean sphere $S_{min}$ by an amount equal to half the difference $(S_{max}-S_{min})$ between the maximum and minimum values of the mean sphere in said region, the ratio of the sphere gradient to said difference is between 0.015 and 0.07 $\text{mm}^{-1}$.

In yet another embodiment, the angle from which two points located on a half-circle of 20 mm radius centered on the geometric center of the lens in the upper part of the lens and which have a cylinder equal to half the difference $(S_{max}-S_{min})$ between the maximum and minimum values of the mean sphere in said region are seen from said center is at least equal to twice the angle from which two points located on a half-circle of 20 mm radius centered on the geometric center of the lens in the lower part of the lens and which have a cylinder equal to half said difference $(S_{max}-S_{min})$ are seen from said center.

Figure 2:
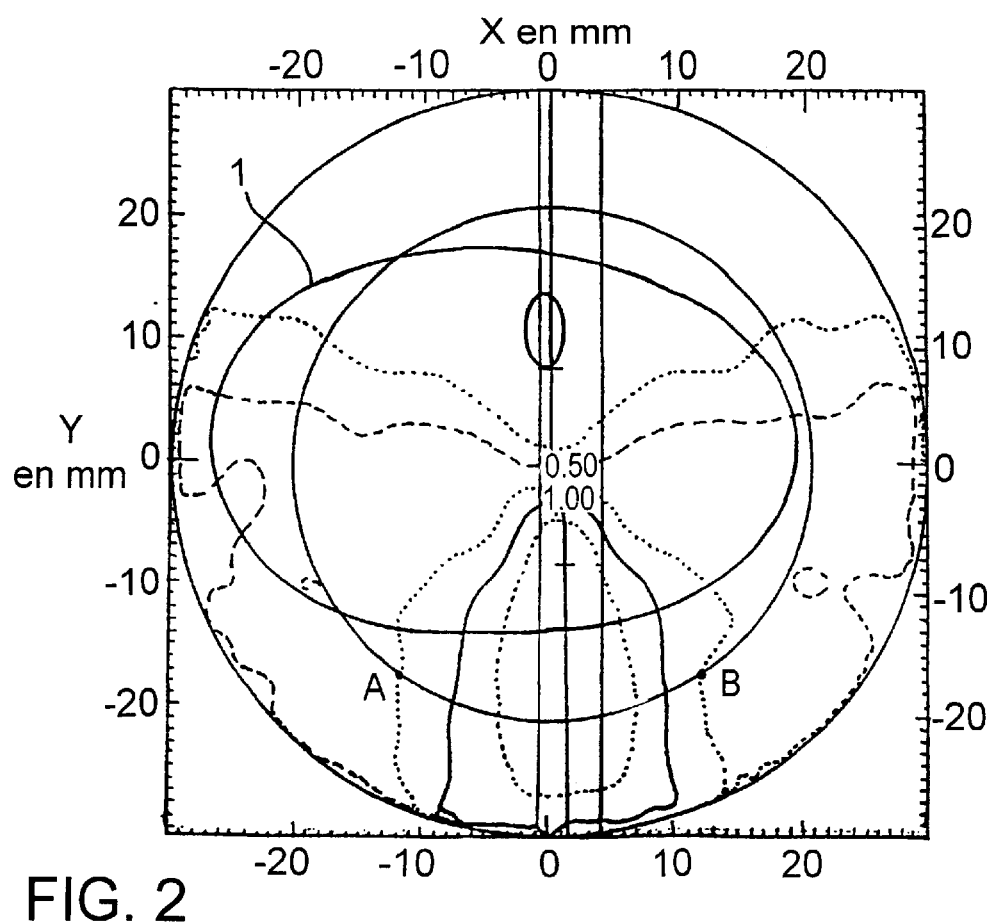
Figure 3:
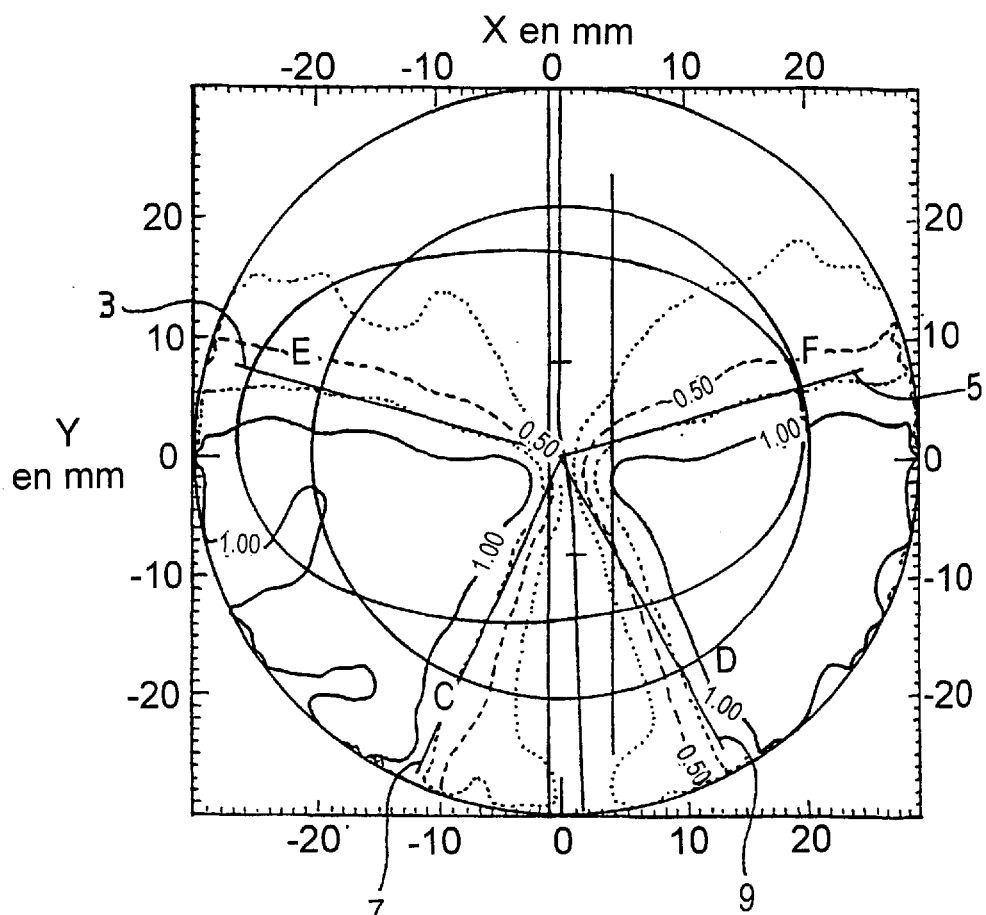
Figure 4:
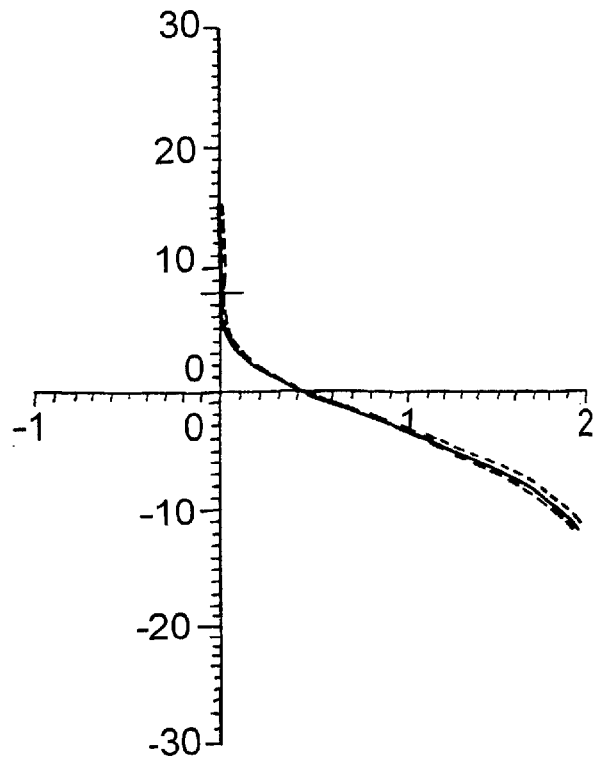
Figure 5:
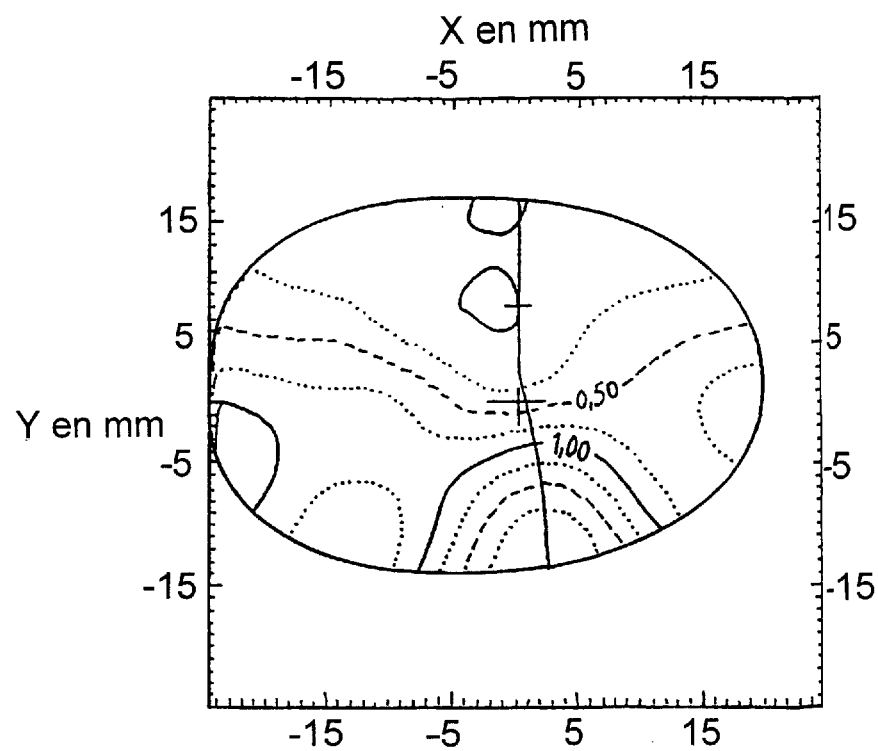
Figure 6:
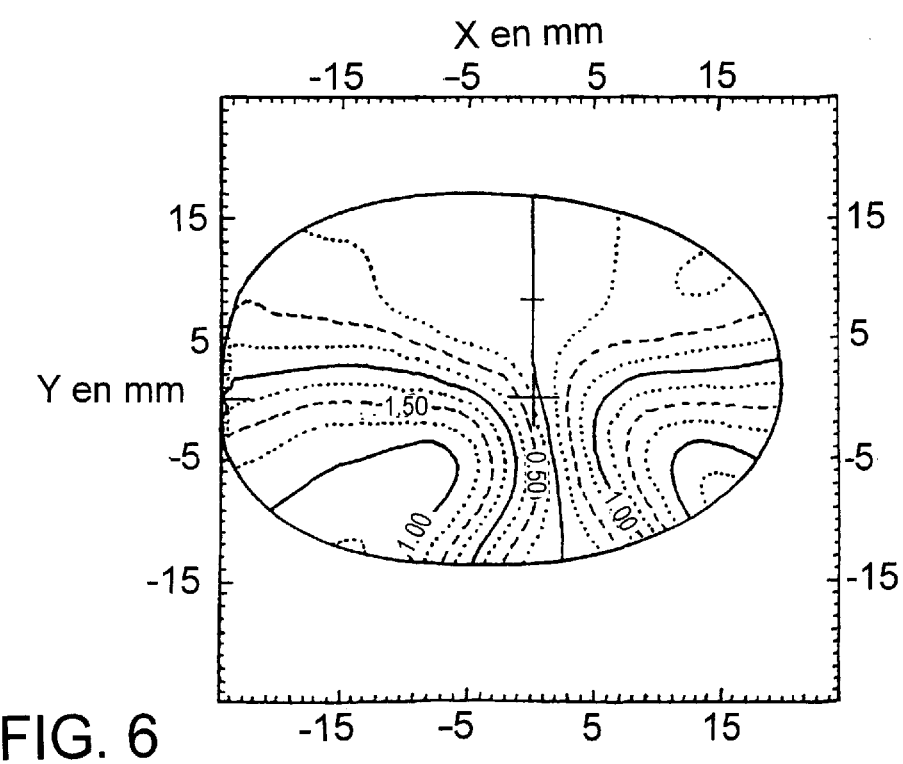

Other characteristics and advantages of the invention will appear on reading the following detailed description of the embodiments of the invention, given solely by way of example and with reference to the drawings which show:

FIG. 1, a graph of mean sphere along the meridian of a lens according to the invention, of one and a half diopters addition;

FIG. 2, a mean sphere map of the lens of FIG. 1;

FIG. 3, a cylinder map of the lens of FIG. 1;

FIG. 4, a graph of mean sphere along the meridian of a lens of the prior art;

FIG. 5, a mean sphere map of the lens of FIG. 4;

FIG. 6, a cylinder map of the lens of FIG. 4.

The invention proposes a lens having both a small cylinder on the surface of the lens and a fast power variation at least in a central region of the lens—which is equivalent to a short progression length for a conventional progressive lens. It is necessary to understand that the optimization of a progressive lens or of a multifocal lens is the result of a compromise between various parameters, and that it is even easier to produce a "gentle" lens—that is to say without sudden variations in sphere and cylinder—when the progression length is long. The lens of the invention may be mounted in small frames, and it also provides improved comfort for wearers on extended use of the near vision region.

The invention proposes applying a restriction on the maximum sphere and the cylinder on the aspherical face of the lens, which is expressed as follows:

$$L<1/(-0.031\times R^2 +0.139\times R+0.014) \quad (1)$$

In this formula, the value L is given by:

$$L=(S_{max}-S_{min})/gradS_{max} \quad (2)$$

where $S_{max}$ is the maximum value of the mean sphere in a region of a 40 mm diameter circle centered on the geometric center of the lens which is limited by vertical straight lines at 1 mm from this center on the temporal side and at 4 mm from this center on the nasal side;

$S_{min}$ is the minimum value of the mean sphere in this same region and $gradS_{max}$ is the maximum value of the gradient of the mean sphere in this same region.

In this case, the gradient is defined conventionally as the vector whose coordinates along each axis are respectively equal to the partial derivatives of the mean sphere along this axis, and, by misuse of language, the normal of the vector gradient is called gradient, that is:

$$gradS = \|\overrightarrow{gradS}\| = \sqrt{\left(\frac{\partial S}{\partial x}\right)^2 + \left(\frac{\partial S}{\partial x}\right)^2}$$

The quantity L is equivalent to a length, and is representative of the length of the lens over which the mean sphere goes from the minimum value to the maximum value. Thus, if the mean sphere were to vary linearly over the surface of the lens, the quantity L would be exactly equal to the distance between the points of minimum and maximum mean sphere.

This quantity is evaluated in a region of the lens located around the vertical passing through the geometric center of the lens; for a progressive lens, this region is the region surrounding the main meridian of progression; for a lens dedicated to near vision, this region is the region of intersection between the gaze of the wearer and the surface of the lens, when the wearer looks straight ahead at various distances.

In formula (1), the value of R is given by:

$$R=C_{max}/(S_{max}-S_{min}) \quad (3)$$

where $C_{max}$ is the maximum cylinder value inside a 40 mm diameter circle centered on the geometric center of the lens.

The quantity R is in fact the maximum cylinder in the useful part of the lens, normalized by the maximum difference between the mean spheres, in other words, normalized by the variation in sphere over the lens. In the case of a progressive lens, this quantity is equal to the maximum cylinder normalized by the addition; the definition of R which is proposed according to the invention is applicable not only to progressive lenses, but also to lenses dedicated to near vision; this definition is more generally applicable to any lens having a power variation.

The formula (1) provides a limitation to the value of L, depending on the value of R; qualitatively, this formula in fact proposes limiting the length over which the mean sphere passes from the minimum value to the maximum value, depending on the maximum cylinder. The equation is normalized with respect to the maximum difference in mean sphere, so that it can be applied for the various possible variations in mean sphere. Another way of interpreting the formula consists in limiting the cylinder for a given value of L, in a hitherto ever equalled proportion.

In the remainder of the present description, a lens having an aspherical surface directed toward the object space and a spherical or toric surface directed toward the wearer will be considered by way of example. A lens intended for the right eye will be considered in the example. The lens for the left eye can be simply obtained by symmetry of this lens with respect to the vertical plane passing through the geometric center. A system of orthonormal coordinates is used, where the X-axis corresponds to the horizontal axis of the lens and the Y-axis to the vertical axis; the center O of the coordinate system is the geometric center of the aspherical surface of the lens. In the remainder, the axes are graduated in millimeters. In the remainder, a lens of one and a half diopters addition and of a base or sphere at the reference point in far vision of 5 diopters will be considered by way of example.

FIG. 1 shows a graph of the mean sphere along the meridian of a lens according to the invention, of one and a half diopters addition; diopters are plotted on the X-axis and the y coordinates on the lens are plotted on the Y-axis, in mm. The reference meridian is defined as explained above, as the line of intersection of the gaze of an average wearer with the aspherical surface of the lens. In practice, it is possible to use the definitions of the reference meridian proposed in the aforementioned patent applications of the applicant, which are satisfactory. The meridian obtained after optimization of the lens surface, defined as the location of the middles of the horizontal segments between the half-addition isocylinder lines, is substantially coincident with this reference meridian.

The control point for far vision is at a coordinate y=8 mm on the surface, and has a sphere of 5.00 diopters, and a cylinder of 0.02 diopters. The control point for near vision is located at a coordinate y=−8 mm on the surface, and has a sphere of 6.50 diopters, and a cylinder of 0.02 diopters. In the example, the nominal addition of the lens—one and a half diopters—is equal to the addition calculated as the difference between the mean sphere of the control points. FIG. 1 shows the mean sphere in solid line and the main curves $1/R_1$ and $1/R_2$ in broken line. Because of the trimming of the lens appearing on the next figures is cut, the part of the meridian available on the lens is that within the interval [−13, 17] for the y coordinate in mm. It will be seen on the figure that there remains a region of near vision with a substantially constant sphere, in the interval [−13, −7]; also, there remains on the meridian a region of far vision with a substantially constant sphere, in the interval [7, 17]. Between these two regions, the power along the meridian varies gently and in a substantially linear manner.

For this lens, with 1.50 diopters addition, the value $S_{max}-S_{min}$ is also 1.53 diopters. The mean sphere gradient is maximum at the point with coordinates x=0.5 and y=−1.5 and reaches the value of 0.20 diopters/mm. The value of L is therefore 7.64 mm.

This length is less than that found on applying formula (2) to progressive lenses or to lenses dedicated to near vision of the prior art. By way of example, the progressive lenses of the applicant described in U.S. Pat. No. 5,488,442 have a progression length of about 12.5 mm and the value of L for these lenses is 11.79 mm.

FIG. 2 shows a mean sphere map of the lens of FIG. 1; in addition, the machining line 1 of the lens to allow mounting in a small frame is plotted thereon; generally, in Europe, frames are considered as small frames when the height of the frame (Boxing B dimension, standard ISO8624 on systems for measuring eyeglasses frames) is less than 35 mm. In the United States, a frame is considered to be small for a Boxing B dimension of less than 40 mm; these are mean values. In the example, the height of the frame is equal to 31 mm and the width (Boxing A dimension) is equal to 46 mm, which corresponds to a frame for a seven year old child. The map of FIG. 2 shows the projection of the aspherical surface of a lens in the (x, y) plane; the (x, y) coordinate system defined above, and the main meridian of progression can be recognized thereon. The reference points for far vision and for near vision have respective coordinates of (0; 8) and (1.2; −8). The X-axis of the control point for near vision may vary depending on the addition, as described in FR-A-2 683 642 and FR-A-2 683 643.

In the example of the figure, the main meridian of progression has three parts overall. In the first part, the main meridian of progression has a vertical segment, coincident with the Y-axis. This segment terminates, at its lower part, substantially at the mounting center. Preferably, the difference between the sphere at the mounting center and the sphere at the reference point for far vision is less than or equal to 0.25 diopters, or even to 0.15 diopters.

The second part of the meridian starts substantially at the mounting center. It is inclined on the nasal side of the lens, substantially up to a point where the difference in mean sphere with respect to the far vision point reaches 85% of the addition.

The third part of the meridian extends from this point, substantially vertically downward. It corresponds to the near vision region.

The isosphere lines appear on FIG. 2, that is to say the lines formed from the points having the same value of mean sphere. The lines are plotted for values of mean sphere with a 0.25 diopter step, the mean sphere being calculated with respect to the mean sphere of the reference point for far vision. The figure shows the 0 diopter isosphere line, which is in solid line and goes through the far vision reference point; it also shows the 0.25 diopter, 0.50 diopter, 0.75 diopter, 1.00 diopter, 1.25 diopter and 1.50 diopter isosphere lines.

The vertical straight lines located on either side of the geometric center of the lens, at 1 mm from the center on the temporal side and at 4 mm from the center on the nasal side, are also plotted in FIG. 2. In the example, the lens is a right lens: the multifocal surface is the outer surface of the lens, and the main meridian is directed toward the right side. The nasal side is on the right of the figure, and the temporal side on the left of the figure. These two straight lines define, in the 40 mm diameter circle centered on the geometric center of the lens, a region which comprises the main meridian of progression. The 40 mm diameter circle corresponds to the region of the lens which is generally most used by a wearer. As explained above, the quantity L is evaluated in this region.

The points of intersection A and B between the 40 mm diameter circle centered on the geometric center of the lens and the isosphere line $(S_{max}-S_{min})/2$ which corresponds to 0.75 diopters are also plotted in FIG. 2. These points are located on either side of the near vision region. At each of these points, it is advantageous for the ratio $gradS/(S_{max}-S_{min})$ of the gradient of the sphere to the difference between the maximum sphere and the minimum sphere in the region surrounding the meridian to be between 0.015 and 0.07 $mm^{-1}$. In other words, the gradient of the sphere at these points, normalized by the quantity $S_{max}-S_{min}$ is between these limits. This restriction limits the variations in the sphere in the bottom of the near vision region, and prevents the short length of variation in the sphere according to the invention from leading to large variations in the sphere in the lower part of the near vision region. In the example, the sphere gradient is 0.028 diopters/mm at point A, and the ratio at the addition is therefore 0.018 $mm^{-1}$. For point B, the sphere gradient is 0.035 diopters/mm, and the ratio at the addition is 0.023 $mm^{-1}$.

FIG. 3 shows a map of the cylinder of a lens according to the invention; the same graphical conventions and the same notations as in FIG. 2 are used, but plotting the cylinder rather than the sphere on the figure. From the point of view of the isocylinder lines, FIG. 3 shows that the lines are well spaced out in the region of far vision, come close together in the intermediate vision region, and are again well spaced out, even inside a small frame. The maximum cylinder is reached in the 40 mm diameter circle at a point of coordinates x=−4.5 and y=−2.5, with a value at this point of 1.20 diopters. The value of R for this lens is therefore 0.79.

In this case, $$1/(-0.031 \times R^2 + 0.139 \times R + 0.014) = 9.57$$

and equation 1 is properly satisfied.

In the example, for this value of L of 7.64 mm, the region of near vision, which starts substantially at the height at which 85% of the addition or of the ratio $S_{max}-S_{min}$ is reached, is very nearly 5 mm under the geometric center of the lens. This position corresponds to the position of the area of hear vision in the bifocal lenses of the prior art; in this way, as explained above, easy adaptation by wearers of bifocal lenses to the progressive lenses according to the invention is ensured. In fact, no change in posture is needed to go from bifocal lenses to a lens of the invention.

The points of intersection of the 40 mm diameter circle centered on the geometric center of the lens and of the isocylinder lines $(S_{max}-S_{min})/2$, that is 0.75 diopters are also plotted in FIG. 3; the value of 0.75 diopters corresponds approximately to half the difference $S_{max}-S_{min}$, in other words to half the addition of the progressive lens. There are four of these intersection points, namely two points E and F in the upper part of the lens and two points C and D in the lower part of the lens.

The region delimited by the half-lines 3 and 5 coming from the geometric center of the lens, and passing through the points E and F in the upper part of the lens corresponds substantially to the far vision region of the lens. The invention proposes that the angle between these half-lines be between 130° and 155°. These values provide a good width for the far vision region and comfort of the lens in far vision. For a lens dedicated to the near vision region, this restriction also ensures clear vision in the upper part of the lens—which is not strictly speaking a far vision region. In the example, as shown in the figure, the angle is close to 149°.

Similarly, the region delimited by the half-lines 7 and 9 coming from the geometric center of the lens and passing through the points C and D in the lower part of the lens corresponds substantially to the hear vision region of the lens. The invention proposes that the angle between these half-lines be between 40° and 55°. These values ensure a good width of the near vision region and comfort of the lens in near vision. This restriction is applicable both to progressive lenses, such as those of the example, and to lenses dedicated to the near vision region. In the example, as shown in the figure, the angle is close to 52°.

For the points C, D, E and F, the invention in addition proposes a limit on the cylinder gradient. The cylinder gradient is defined in the same way as the mean sphere gradient. The proposed limit is similar to that for the sphere gradient normalized by the difference $S_{max}-S_{min}$, so as to be applied equally for all the mean sphere differences. The invention therefore proposes that the quantity gradC/$(S_{max}-S_{min})$ for the points E and F in the upper part of the lens be between 0.03 and 0.11 mm$^{-1}$. The invention also proposes that the quantity gradC/$(S_{max}-S_{min})$ for the points C and D in the lower part of the lens be between 0.05 and 0.14 mm$^{-1}$.

Both for the far vision region and for the near vision region, these limits on the cylinder gradient prevent large variations in the cylinder on the edges of the vision regions, and reinforce the gentleness of the lens. It is more relaxed in the upper part of the lens than in the lower part of the lens, because the points E and F in the upper part of the lens are further apart than the points C and D in the lower part of the lens. In the example, the cylinder gradient is 0.097 and 0.165 diopters/mm at points C and D, respectively. The ratio for these points is 0.064 and 0.108 mm$^{-1}$, respectively. The cylinder gradient is 0.095 diopters/mm at point E, and 0.099 diopters/mm at point F. The ratio at the addition is 0.062 or 0.065 mm$^{-1}$, respectively.

The invention further proposes that the cylinder gradient at points C and D, in the lower part of the lens, is less than twice the cylinder gradient at point E on the one hand and at point F on the other hand. This condition limits the variations in the cylinder in the lower part of the lens where the isocylinder lines are closer together.

Apart from the elements already described, FIGS. 2 and 3 show, in bold line, the limit of a frame called a small frame; typically a frame whose dimension B in the Boxing system is less than 35 or 40 mm is called a small frame.

FIGS. 4, 5 and 6 show respectively a graph of mean sphere along the meridian, a mean sphere map and a cylinder map of a lens of the prior art, of addition 2; the limit of the frame already shown in FIGS. 2 and 3 is plotted thereon, for comparison. The simple comparison of FIG. 4 to FIG. 1, of FIG. 5 to FIG. 2, or of FIG. 6 to FIG. 3 demonstrates the problems of the prior art for small frames, and the solution of the invention.

In FIG. 4 it will be seen that there is no longer a near vision region in the lens, in which the power along the meridian is substantially constant. On the contrary, the meridian is cleanly cut and the part of substantially constant power is in the part of the lens which has been cut-away. In FIG. 6, it will be seen that the intermediate vision region of the lens of the prior art is in the vicinity of the lower edge of the cut lens. A considerable part of the near vision region is cut into.

The various characteristics which allow the various lenses according to the invention to be produced will now be detailed. The surface of the lenses is, in a manner known per se, continuous and can be continuously derived three times. As is known to the person skilled in the art, the reference surface of progressive lenses is obtained by means of digital optimization using a computer, by setting the limit conditions for a certain number of lens parameters.

It is possible to use as limit conditions one or more of the criteria defined above, and in particular the criteria of claim 1.

The examples of the invention given above relate to a progressive lens; the invention is also applicable to a lens dedicated to near vision. For such a lens, the optimization can be carried out without restrictions on the far vision.

Advantageously, it is also possible to start by defining, for each of the lenses of the family, a main meridian of progression. To this end, it is possible to use the teaching of the aforementioned patent FR-A-2 683 642. It is also possible to use any other definition of the main meridian of progression in order to apply the teaching of the invention. Advantageously, the main meridian of progression is substantially coincident with the line formed from the middles of the horizontal segments, the ends of which have a cylinder value of 0.5 diopters. The lens is thus horizontally symmetrical in terms of cylinder, with respect to the meridian. Lateral vision is enhanced.

Of course, the present invention is not limited to the present description: inter alia, the aspherical surface could be the surface directed toward the lens wearer. Moreover, the description has not laid stress on the existence of lenses which may be different for each eye. Finally, although the description gives a lens example of one and a half diopters addition, and diopters base, the invention is also applicable to lenses whatever the wearer's prescription. More generally, the invention may be applied to any lens having a power variation.

What is claimed is:

1. A multifocal ophthalmic lens, comprising an aspherical surface with a mean sphere and a cylinder at every point thereof, characterized by the equation:

$$L<1/(-0.031 \times R^2+0.139 \times R+0.014)$$

where L is equal to the ratio $(S_{max}-S_{min})$/grad$S_{max}$, the ratio of the difference between the maximum and minimum values of the mean sphere in a region of a 40 mm diameter circle centered on the geometric center of the lens, this region being limited by vertical straight lines at 1 mm from this center on the temporal side and at 4 mm from this center on the nasal side, on the one hand, to the maximum value of the gradient of the mean sphere in this same region, on the other hand, and where R is equal to the ratio $C_{max}/(S_{max}-S_{min})$, the ratio of the maximum cylinder value inside said circle to the difference between the maximum and minimum values of the mean sphere in said region.

2. The lens of claim 1, wherein the angle between two half-lines (3,5) coming from the geometric center of the lens and passing respectively through the points of a 20 mm radius circle centered on the geometric center which have a cylinder equal to half the difference $(S_{max}-S_{min})$ between the maximum and minimum values of the mean sphere in said region and which are located in the upper half of the lens is between 130° and 155°.

3. The lens of claim 1, wherein the angle between two half-lines (7,9) coming from the geometric center of the lens and passing respectively through the points of a 20 mm radius circle centered on the geometric center which have a cylinder equal to half the difference $(S_{max}-S_{min})$ between the maximum and minimum values of the mean sphere in said region and which are located in the lower half of the lens is between 40° and 55°.

4. The lens of claim 1, wherein, at a point located on a half-circle of 20 mm radius centered on the geometric center in the upper part of the lens, and which has a cylinder equal to half the difference $(S_{max}-S_{min})$ between the maximum and minimum values of the mean sphere in said region, the ratio of the cylinder gradient to said difference is between 0.03 and 0.11 mm$^{-1}$.

5. The lens of claim 1, wherein, at a point located on a half-circle of 20 mm radius centered on the geometric center in the lower part of the lens, and which has a cylinder equal to half the difference ($S_{max}-S_{min}$) between the maximum and minimum values of the mean sphere in said region, the ratio of the cylinder gradient to said difference is between 0.05 and 0.014 $mm^{-1}$.

6. The lens of claim 1, wherein the ratio of
the maximum cylinder gradient on the two points located on a half-circle of 20 mm radius centered on the geometric center in the lower part of the lens, and which have a cylinder equal to half the difference ($S_{max}-S_{min}$) between the maximum and minimum values of the mean sphere in said region, on the one hand, to
the minimum cylinder gradient on the two points located on a half-circle of 20 mm radius centered on the geometric center in the upper part of the lens, and which have a cylinder equal to half the difference (Smax–Smin) between the maximum and minimum values of the mean sphere in said region, on the other hand, is less than 2.

7. The lens of claim 1, for a point located on a 20 mm radius circle centered on the geometric center, and whose mean sphere is greater than the minimum mean sphere $S_{min}$ by an amount equal to half the difference ($S_{max}-S_{min}$) between the maximum and minimum values of the mean sphere in said region, the ratio of the sphere gradient to said difference is between 0.015 and 0.07 $mm^{-1}$.

8. The lens of claim 1, wherein the angle from which two points located on a half-circle of 20 mm radius centered on the geometric center of the lens in the upper part of the lens and which have a cylinder equal to half the difference ($S_{max}-S_{min}$) between the maximum and minimum values of the mean sphere in said region are seen from said center is at least equal to twice the angle from which two points located on a half-circle of 20 mm radius centered on the geometric center of the lens in the lower part of the lens and which have a cylinder equal to half said difference ($S_{max}-S_{min}$) are seen from said center.

9. A multifocal ophthalmic lens, comprising an aspherical surface with a mean sphere and a cylinder at every point thereof, the surface having a near vision region and being characterized by the equation:

$$L<1/(-0.031 \cdot R2+0.139 \cdot R+0.014)$$

where L is equal to the ratio (Smax–Smin)/gradSmax of the difference between the maximum and minimum values of the mean sphere in a region of a 40 mm diameter circle centered on the geometric center of the lens, this region being limited by vertical straight lines at 1 mm from this center on the temporal side and at 4 mm from this center on the nasal side, on the one hand, to the maximum value of the gradient of the mean sphere in this same region, on the other hand, and where R is equal to the ratio Cmax/(Smax–Smin) of the maximum cylinder value inside said circle to the difference between the maximum and minimum values of the mean sphere in said region.

10. The lens of claim 9, wherein the angle between two half-lines (3, 5) coming from the geometric center of the lens and passing respectively through the points of a 20 mm radius circle centered on the geometric center which have a cylinder equal to half the difference (Smax–Smin) between the maximum and minimum values of the mean sphere in said region and which are located in the upper half of the lens is between 130° and 155°.

11. The lens of claim 9, wherein the angle between two half-lines (7, 9) coming from the geometric center of the lens and passing respectively through the points of a 20 mm radius circle centered on the geometric center which have a cylinder equal to half the difference ($S_{max}-S_{min}$) between the maximum and minimum values of the mean sphere in said region and which are located in the lower half of the lens is between 40° and 55°.

12. The lens of claim 9, wherein, at a point located on a half-circle of 20 mm radius centered on the geometric center in the upper part of the lens, and which has a cylinder equal to half the difference ($S_{max}-S_{min}$) between the maximum and minimum values of the mean sphere in said region, the ratio of the cylinder gradient to said difference is between 0.03 and 0.11 $mm^{-1}$.

13. The lens of claim 9, wherein, at a point located on a half-circle of 20 mm radius centered on the geometric center in the lower part of the lens, and which has a cylinder equal to half the difference ($S_{max}-S_{min}$) between the maximum and minimum values of the mean sphere in said region, the ratio of the cylinder gradient to said difference is between 0.05 and 0.014 $mm^{-1}$.

14. The lens wherein the ratio of
the maximum cylinder gradient on the two points located on a half-circle of 20 mm radius centered on the geometric center in the lower part of the lens, and which have a cylinder equal to half the difference (Smax–Smin) between the maximum and minimum values of the mean sphere in said region, on the one hand, to
the minimum cylinder gradient on the two points located on a half-circle of 20 mm radius centered on the geometric center in the upper part of the lens, and which have a cylinder equal to half the difference ($S_{max}-S_{min}$) between the maximum and minimum values of the mean sphere in said region, on the other hand, is less than 2.

15. The lens of claim 9, for a point located on a 20 mm radius circle the geometric center, and whose mean sphere is greater than the minimum mean sphere $S_{min}$ by an amount equal to half the difference ($S_{max}-S_{min}$) between the maximum and minimum values of the mean sphere in said region, the ratio of the sphere gradient to said difference is between 0.015 and 0.07 $mm^{-1}$.

16. The lens of claim 9, wherein the angle from which two points located on a haltricircle of 20 mm radius centered the geometric center of the lens in the upper part of the lens and which have a cylinder equal to half the difference ($S_{max}-S_{min}$) between the maximum and minimum values of the mean sphere in said region are seen from said center is at least equal to twice the angle from which two points located on a half-circle of 20 mm radius centered on the geometric center of the lens in the lower part of the lens and which have a cylinder equal to half said difference ($S_{max}-S_{min}$) are seen from said center.

17. A multifocal ophthalmic lens, comprising an aspherical surface with a mean sphere and a cylinder at every point thereof, the surface having a near vision region and a far visions region and being characterized by the equation:

$$L<1/(-0.031 \cdot R2+0.139 \cdot R+0.014)$$

where L is equal to the ratio (Smax–Smin)/gradSmax of the difference between the maximum and minimum values of the mean sphere in a region of a 40 mm diameter circle centered on the geometric center of the lens, this region being limited by vertical straight lines at 1 mm from this center on the temporal side and at 4 mm from this center on the nasal side, on the one hand, to the maximum value of the gradient of the mean sphere in this same region, on the other hand, and where R is equal to the ratio Cmax/(Smax−Smin) of the maximum cylinder value inside said circle to the difference between the maximum and minimum values of the mean sphere in said region.

18. The lens of claim 17, the angle between two half-lines (3,5) coming from the geometric center of the lens and passing respectively through the points of a 20 mm radius circle centered on the geometric center which have a cylinder equal to half the difference ($S_{max}-S_{min}$) between the maximum and minimum values of the mean sphere in said region and which are located in the upper half of the lens is between 130° and 155°.

19. The lens of claim 17, wherein the angle between two half-lines (7, 9) coming from the geometric center of the lens and passing respectively through the points of a 20 mm radius circle centered on the geometric center which have a cylinder equal to half the difference ($S_{max}-S_{min}$) between the maximum and minimum values of the mean sphere in said region and which are located in the lower half of the lens is between 40° and 55°.

20. The lens of claim 17, wherein, at a point located on a half-circle of 20 mm radius centered on the geometric center in the upper part of the lens, and which has a cylinder equal to half the difference ($S_{max}-S_{min}$) between the maximum and minimum values of the mean sphere in said region, the ratio of the cylinder gradient to said difference is between 0.03 and 0.11 mm$^{-1}$.

21. The lens of claim 17, wherein, at a point located on a half-circle of 20 mm radius centered on the geometric center in the lower part of the lens, and which has a cylinder equal to half the difference ($S_{max}-S_{min}$) between the maximum and minimum values of the mean sphere in said region, the ratio of the cylinder gradient to said difference is between 0.05 and 0.014 mm$^{-1}$.

22. The lens of claim 17, wherein the ratio of the maximum cylinder gradient on the two points located on a half-circle of 20 mm radius centered on the geometric center in the lower part of the lens, and which have a cylinder equal to half the difference (Smax−Smin) between the maximum and minimum values of the mean sphere in said region, on the one hand, to the minimum cylinder gradient on the two points located on a half-circle of 20 mm radius centered on the geometric center in the upper part of the lens, and which have a cylinder equal to half the difference (Smax−Smin) between the maximum and minimum values of the mean sphere in said region, on the other hand, is less than 2.

23. The lens of claim 17, wherein, for a point located on a 20 mm radius circle centered on the geometric center, and whose mean sphere is greater than the minimum mean sphere $S_{min}$ by an amount equal to half the difference ($S_{max}-S_{min}$) between the maximum and minimum values of the mean sphere in said region, the ratio of the sphere gradient to said difference is between 0.015 and 0.07 mm$^{-1}$.

24. The lens of claim 17, wherein the angle from which two points located on a of 20 mm radius centered on the geometric center of the lens in the upper part of the lens and which have a cylinder equal to half the difference ($S_{max}-S_{min}$) between the maximum and minimum values of the mean sphere in said region are seen from said center is at least equal to twice the angle from which two points located on a half-circle of 20 mm radius centered on the geometric center of the lens in the lower part of the lens and which have a cylinder equal to half said difference ($S_{max}-S_{min}$) are seen from said center.

* * * * *

UNITED STATES PATENT AND TRADEMARK OFFICE
CERTIFICATE OF CORRECTION

PATENT NO.    : 6,595,637 B2
DATED         : July 22, 2003
INVENTOR(S)   : Francoise Ahsbahs and Gilles Le Saux It is certified that error appears in the above-identified patent and that said Letters Patent is hereby corrected as shown below:

<u>Title page,</u>
Item [*] Notice, replace "0 days" with -- 196 days --

<u>Column 1,</u>
Line 2, replace "Fast" with -- Abrupt --

<u>Column 8,</u>
Line 9, after "-$S_{min}$" insert -- , --
Lines 39 and 67, replace "hear" with -- near --

<u>Column 10,</u>
Line 22, between "and" and "diopters", insert -- 5 --

<u>Column 11,</u>
Line 19, replace "(Smax-Smin)" with -- ($S_{max}$-$S_{min}$) --
Line 22, between "1," and "for", insert -- wherein, --
Line 47, replace "(Smax-Smin)/gradSmax" with -- ($S_{max}$-$S_{min}$)/grad$S_{max}$ --
Line 56, replace "Cmax/(Smax-Smin)" with -- $C_{max}$/($S_{max}$-$S_{min}$) --
Line 64, replace (Smax-Smin)" with -- ($S_{max}$-$S_{min}$) --

<u>Column 12,</u>
Line 23, between "lens" and "wherein", insert -- of claim 9, --
Line 28, replace "Smax-Smin" with -- $S_{max}$-$S_{min}$ --
Line 39, after "claim 9,", insert -- wherein, --
Line 46, replace "haltricircle" with -- half-circle --
Line 63, replace "(Smax-Smin)/gradSmax" with -- ($S_{max}$-$S_{min}$)/grad$S_{max}$ --

<u>Column 13,</u>
Line 5, replace "Cmax/(Smax-Smin)" with -- $C_{max}$/($S_{max}$-$S_{min}$) --
Line 9, after "claim 17," insert -- wherein --

<u>Column 14,</u>
Lines 8 and 15, replace "(Smax-Smin)" with -- ($S_{max}$-$S_{min}$) --

UNITED STATES PATENT AND TRADEMARK OFFICE
CERTIFICATE OF CORRECTION

PATENT NO.   : 6,595,637 B2
DATED        : July 22, 2003
INVENTOR(S)  : Francoise Ahsbahs and Gilles Le Saux It is certified that error appears in the above-identified patent and that said Letters Patent is hereby corrected as shown below:

<u>Column 14 (cont'd),</u>
Line 25, between "a" and "of" insert -- half-circle --

Signed and Sealed this

First Day of June, 2004

JON W. DUDAS
*Acting Director of the United States Patent and Trademark Office*